March 26, 1963
A. W. SEAR ETAL
3,083,276
INTEGRATING ACCELEROMETER
Filed June 8, 1959
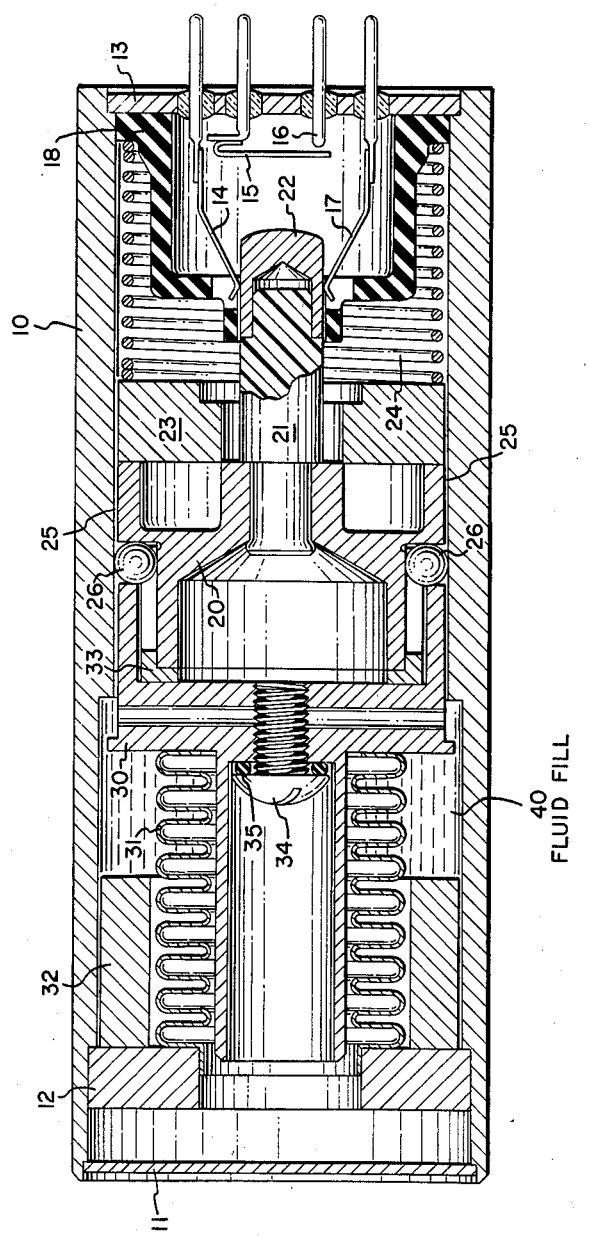
INVENTORS
ARTHUR W. SEAR
ROBERT L. STERT
BY
*Warren A. Sturm*
ATTORNEY

United States Patent Office 3,083,276
Patented Mar. 26, 1963

3,083,276
INTEGRATING ACCELEROMETER
Arthur W. Sear and Robert L. Stert, Arcadia, Calif., assignors to Minneapolis-Honeywell Regulator Company, Minneapolis, Minn., a corporation of Delaware
Filed June 8, 1959, Ser. No. 818,831
5 Claims. (Cl. 200—61.45)

This invention relates generally to devices responsive to acceleration forces that provide intelligible signals in accordance with said acceleration forces. It is more particularly related to an art concerned with providing a signal in response to integrated forces of acceleration thus to provide an indication of the present velocity of a device that has been subjected to forces of acceleration.

It is common practice to utilize the integral of the force of acceleration over the period of time that the force is acting, by allowing a mass that may be subjected to the forces of acceleration to change position due to the forces of acceleration but retarded by the influence of a restraining means such as a dashpot mechanism. Also in the past, it has been extremely difficult to obtain a mechanism of this general type that is linear and accurate with respect to temperature variation and a range of accelerating forces. Further, it is desirable to provide further means in devices of this type to prevent operation of an integrating mechanism below predetermined values of acceleration forces, dependent upon particular application, so that initial starting point of operation of the integrating mechanism will remain the same regardless of previous undesirable acceleration forces applied to the device.

It is therefore an object of this invention to provide an improved integrating accelerometer linear in operation for a substantial range of temperature variation.

It is a further object of this invention to provide an integrating accelerometer in which a high degree of accuracy and repeatability is attained.

It is a still further object of this invention to provide an integrating accelerometer in which a high degree of sensitivity to forces of acceleration is attained.

It is a still further object of this invention to provide an integrating accelerometer in which operation is initiated upon the applied force of acceleration exceeding a predetermined minimum value.

These and other objects of our invention will become apparent to one skilled in the art from a consideration of the appended specification, claims, and drawing in which;

The FIGURE is a cross sectional representation of one embodiment of an integrating accelerometer that illustrates the use of the principles of our invention.

Referring now to the figure of the drawing, the specific embodiment is illustrative of an accelerometer device that might be used to provide an electrical signal when the integrated value of the acceleration forces reaches a predetermined value to thereby provide an indication that, in this case, a particular value of velocity has been attained.

The accelerometer device comprises a casing, or housing, 10, having a first sealing bulkhead means, 11, at its left end, and reading from left to right, a second bulkhead means, 12, that is attached to the housing means 10, and a third bulkhead means 18, that is held against bulkhead means 13 at the right hand end of the drawing by the pressure of spring 24. For convenience, it may be assumed that the container or housing 10 and the component parts shown inside of it in section, are of a cylindrical configuration.

Member 13 is provided with a plurality of perforations for the insertion of a plurality of contact pins associated with a pair of contacts 14 and 17 and a further pair of contacts 15 and 16 that are positioned internally of the casing 10 and held in such position by insulated sealing compound contained around the periphery of the pins and in the perforations in the member 13.

Bulkhead member 12 has a central opening to which is connected the bellows member 31 that is in turn connected to member 30 that serves as a movable support for the initial starting, or rest, position of an integrating mass 20. Bellows 31 may be affixed to bulkhead member 12 and movable member 30 by any suitable method such as soldering and welding to provide a fluid seal. Movable member 30 has an opening in the center that is closed by a threaded member 34 and a compressible washer 35 to provide a means for addition and removal of fluid to the inside of casing 10.

An integrating mass 20, of suitable material and weight, is positioned internally of casing 10 by anti-friction ball positioning members 26 that are provided in suitable number to centrally locate the integrating mass 20. A further member 33 is provided at the left hand end of the integrating mass 20 to provide a retaining means for the anti-friction ball positioning members 26 upon movement of the integrating mass 20. A further member 21, made of suitable insulating material, is rigidly attached to the right end of integrating mass 20 and is adapted to be carried by integrating mass 20. Member 21 is provided with an end portion of suitable conducting material at its right hand extremity. An orifice, 25, is defined by the inside of casing 10 and the periphery of mass 20.

A further means 23, of weight determined by the desired minimum acceleration response characteristics, is positioned against integrating mass 20 by a biasing spring 24 of suitable spring rate characteristics, again determined by the desired response characteristics of the device with respect to the predetermined minimum value of acceleration. Member 18 is made of an insulating material and is provided with a central opening to allow movement of the member 21 carried by the integrating mass 20 through it to actuate the contacts 15 and 16. Further openings in member 18 are appropriately provided for contacts 14 and 17.

The inside of casing 10, as defined by the bulkhead member 13 at the right hand end and the bellows member 31 at the left hand end, is filled with a suitable fluid, for example silicone oil. A further member 32, the purpose of which will be explained below may be provided on the inside fluid filled portion of the accelerometer device.

*Operation of the Figure*

The drawing shows the accelerometer device in its initial, at rest, position. Assuming the acceleration force is applied from right to left to the device as shown in the drawing, and it is of sufficient magnitude to cause the mass 23 to overcome the force exerted upon it by the bias spring 24 and move quickly to the end of its travel and come to rest against member 18. The action of the force of acceleration upon the integrating mass 20, will cause it to move toward the right hand end of the device at a rate determined by the size of the peripheral orifice 25 and the viscosity of the fluid contained in casing 10. This provides an integrating action that causes the integrating mass to assume a displacement position from its initial position that is proportional to the present velocity of the accelerometer device and the vehicle to which it may be attached.

Upon a predetermined displacement position, the member 21 will have moved to the right so that contacts 14 and 17 will no longer be on the conductive portion 22 of member 21 and a further circuit is thereby opened. The further circuit may be used for a number of purposes, for instance, to indicate that the accelerometer device is in its initial position, or to initiate functions that are necessary as a preparation for the signal provided by the closure of contacts 15 and 16.

If the acceleration force is applied for the necessary time to cause the accelerometer device and vehicle to attain a predetermined velocity, the integrating mass and member 22 will move far enough to the right to close contacts 15 and 16 to provide a signal that is indicative of a predetermined velocity. This signal may be used to initiate further mechanism associated with the vehicle upon which the accelerometer device may be carried.

Should the acceleration force cease, the action of the second mass 23 and its biasing spring 24 will be such as to cause the integrating mass to return to its initial starting position, also at a predetermined rate dependent upon the size of the peripheral orifice 25 and the viscosity of the fluid obtained in housing 10. Therefore, the movement of integrating mass 20 under forces of acceleration may be to the right when the force of acceleration exceeds a predetermined minimum, may be stationary when the force of acceleration balances the force of the bias spring 24, or may be to the left when the force of acceleration becomes less than the force exerted upon a second mass 23 by the spring 24. It should therefore be apparent to those skilled in the art that the contacts 15 and 16 will be closed only upon the accelerometer device and its vehicle attaining a predetermined velocity.

It has been noted that the size of the peripheral orifice and the viscosity of the fluid contained internally of casing 10 will change for variations in temperature of the operating mechanism. This phenomena gives rise to a non-linear operation of the accelerometer device for a range of variations in temperature. It is noted that materials having different temperature coefficients of expansion might be used for the casing and the periphery of the integrating mass to provide, to some extent, a degree of compensation for temperature variations. In order to provide the closure of signal contacts 15 and 16 at an exact predetermined velocity, an adjustable stop has been provided in the form of a member 30 that may be positioned axially of the casing 10 through the action of the bellows member 31 as influenced by the pressure exerted upon it by the fluid contained internally of casing 10. Assuming the use of a fluid which increases in viscosity as the temperature decreases, the shrinkage of the fluid as the temperature decreases will cause the bellows member 31 to expand and member 30 will accordingly move to a new position to the right so that the increased time for the integrating mass 20 to move to its right hand terminal position will be compensated for by reducing the total distance to be traversed so that the time will remain approximately the same and therefore the instant that contacts 15 and 16 are closed will correspond to the predetermined velocity of the accelerometer device and its vehicle. Conversely, should the temperature rise, with a decreasing viscosity and increasing volume of the fluid the bellows member 31, the initial position of the integrating member 20 will be farther toward the left hand end of the accelerometer device and the increased speed at which the integrating mass 20 will move for a given acceleration force will be compensated for by the increased distance through which it must travel to actuate contacts 15 and 16 so that, again, the instant contacts 15 and 16 are closed is indicative of the same predetermined velocity. It should be apparent to one skilled in the art that the application of the principles of our invention to other forms of integrating apparatus, where they are temperature sensitive, may be readily achieved and the particular embodiment shown is intended to be by way of illustration only.

The member 32 near the left end of the accelerometer device shown may be of a size appropriate to adjust the internal fluid filled volume of casing 10 in accordance with the characteristics of the fluid utilized as a filling material.

It is to be understood that modifications of the particular embodiment shown and described in this specification may occur to those skilled in the art and we therefore intend to be limited solely by the scope of the appended claims in which we claim:

1. An integrating accelerometer comprising; a casing; a mass having a peripheral configuration substantially the same as said casing, said mass being capable of movement relative to said casing in accordance with the flow of a fluid medium through the opening formed by the extremity of said mass and said casing; anti-friction support members for supporting said mass centrally of said casing; a first movable member mounted inside said casing and responsive to the fluid pressure inside said casing for determining the initial position of said mass in accordance with said pressure; and variable biasing means mounted within said casing for biasing said mass toward said first movable member whenever the acceleration forces acting upon said mass are below a predetermined minimum value.

2. An integrating accelerometer comprising; a casing; a mass having a peripheral configuration substantially the same as said casing, said mass being capable of movement relative to said casing in accordance with the flow of a fluid medium through an orifice defined by the periphery of said mass and said casing; anti-friction support members for supporting said mass centrally of said casing; a first movable member mounted inside said casing and responsive to the fluid temperature inside said casing for determining the initial position of said mass in accordance with said temperature; biasing means mounted within said casing for biasing said mass toward said first movable member whenever the acceleration forces acting upon said mass are below a predetermined minimum value; and switch means, mounted on said casing, and operable in accordance with a predetermined displacement of said mass from an initial position.

3. In an integrating accelerometer; a cylindrical housing; a first mass positioned within said housing for axial movement thereof and centered within said housing by a plurality of spherical bearing members, said mass being of material having a suitable temperature coefficient of expansion as to provide a constant area peripheral orifice between said mass and said housing for substantial variations in temperature; a second mass positioned within said housing for axial movement thereof, said mass being smaller than said first mass and having a biasing force applied thereto in a direction to hold said first mass in a first position in the absence of acceleration forces above a predetermined minimum; a collapsable chamber filled with a compressible fluid for determining the initial position of said first mass in response to the pressure exerted externally of it by the fluid contained in said housing; and means positioned within said housing for providing a signal when said first mass reaches a predetermined position in response to forces of acceleration.

4. In an integrating accelerometer; a mass movable between first and second positions in response to acceleration forces, said second position being indicative of a velocity attained; means restraining said mass so as to provide movement of said mass proportional to the integral of said acceleration forces, said restraining means being temperature sensitive; further means restraining said mass until a predetermined acceleration force is applied; and means operable in response to temperature variations to alter the first position of said mass with respect to the second position to provide a linear operation of said mass in response to acceleration forces, so that the integrated value of acceleration is the same at the time said mass reaches said second position for a substantial range of temperature variations.

5. In an integrating accelerometer; a mass movable between first and second positions in response to acceleration forces, said second position being indicative of a velocity attained; means restraining said mass so as to provide movement of said mass proportional to the integral of said acceleration forces, said restraining means being temperature sensitive; and means operable in response to changes in temperature to alter said first position of said mass with respect to said second position to provide linear integration in response to acceleration forces by making the time of travel of said mass between said first and second positions constant for a substantial range of temperature.

References Cited in the file of this patent
UNITED STATES PATENTS

| | | |
|---|---|---|
| 2,187,258 | Wood | Jan. 16, 1940 |
| 2,495,226 | Crago | Jan. 24, 1950 |
| 2,603,726 | McLean | July 15, 1952 |
| 2,713,097 | Wooten | July 12, 1955 |
| 2,850,590 | Marks et al. | Sept. 2, 1958 |
| 2,854,539 | Ruppel | Sept. 30, 1958 |
| 2,857,149 | Bourns et al. | Oct. 21, 1958 |
| 2,950,908 | Rainsberger et al. | Aug. 30, 1960 |